United States Patent
Fichter et al.

(10) Patent No.: US 9,621,472 B1
(45) Date of Patent: *Apr. 11, 2017

(54) SYSTEM AND METHOD FOR DYNAMICALLY CONTROLLING SAMPLE RATES AND DATA FLOW IN A NETWORKED MEASUREMENT SYSTEM BY DYNAMIC DETERMINATION OF STATISTICAL SIGNIFICANCE

(71) Applicant: Moat, Inc., New York, NY (US)

(72) Inventors: Daniel E. Fichter, New York, NY (US); Christopher R. Tsoufakis, Salt Lake City, UT (US); Nikki K. Gomez, Brooklyn, NY (US); Aniq Rahman, New York, NY (US); Jonah Goodhart, New York, NY (US); Michael Garrett Seiler, Scarsdale, NY (US); Suryansh Agarwal, West Orange, NJ (US)

(73) Assignee: Moat, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,199

(22) Filed: Mar. 7, 2016

Related U.S. Application Data

(63) Continuation of application No. 14/205,115, filed on Mar. 11, 2014, now Pat. No. 9,282,048.

(Continued)

(51) Int. Cl.
*H04L 12/26* (2006.01)
*H04L 12/825* (2013.01)

(52) U.S. Cl.
CPC .............. *H04L 47/25* (2013.01); *H04L 43/02* (2013.01); *H04L 43/04* (2013.01)

(58) Field of Classification Search
USPC .................. 709/224, 229, 239, 242, 246
See application file for complete search history.

(56) References Cited

U.S. PATENT DOCUMENTS 6,108,637 A  8/2000 Blumenau
6,115,680 A  9/2000 Coffee
(Continued)

OTHER PUBLICATIONS

WELOVEAD, WebDesignServed available on May 19, 2010, retrieved from <http://www.webdesignserved.com/gallery/WELOVEAD-beta/517326>, on Aug. 5, 2015.

(Continued)

*Primary Examiner* — Jude Jean Gilles
(74) *Attorney, Agent, or Firm* — Patent Law Works LLP

(57) ABSTRACT

A system and methods for dynamically controlling sample rates and data flow in a distributed networked environment by dynamic determination of statistical significance or characteristics for an unlimited number of data collection scripts concurrently executed on concurrently rendering web pages operating an unlimited number of advertisements. Consumer and media behaviors are sampled on all the different components of the distributed environment to gather information, which is transmitted to a downstream statistical analytics system. The system and methods are configured to balance the communication data flow and load among servers and browsers in this distributed networked environment that are engaged in viewing of online content including online content with one or more advertisements.

20 Claims, 10 Drawing Sheets

Related U.S. Application Data

(60) Provisional application No. 61/785,930, filed on Mar. 14, 2013.

(56) References Cited

U.S. PATENT DOCUMENTS

| | | | |
|---|---|---|---|
| 6,230,204 B1 * | 5/2001 | Fleming, III | G06F 11/3414 709/224 |
| 6,327,619 B1 | 12/2001 | Blumenau | |
| 6,418,470 B2 | 7/2002 | Blumenau | |
| 6,778,982 B1 * | 8/2004 | Knight | G06Q 10/10 707/737 |
| 7,263,497 B1 * | 8/2007 | Wiser | G06Q 20/3829 705/26.8 |
| 7,310,609 B2 | 12/2007 | Middleton, III et al. | |
| 7,386,473 B2 | 6/2008 | Blumenau | |
| 7,613,635 B2 | 11/2009 | Blumenau | |
| 7,660,737 B1 | 2/2010 | Lim et al. | |
| 7,716,326 B2 | 5/2010 | Blumenau | |
| 7,756,974 B2 | 7/2010 | Blumenau | |
| 7,917,755 B1 | 3/2011 | Giliyaru | |
| 8,108,245 B1 | 1/2012 | Hosea | |
| 8,255,491 B1 | 8/2012 | Arzur | |
| 8,266,115 B1 * | 9/2012 | Park | G06F 17/30864 707/692 |
| 8,386,314 B2 | 2/2013 | Kirkby et al. | |
| 8,508,532 B1 | 8/2013 | Logan | |
| 8,880,996 B1 | 11/2014 | Deshpande | |
| 9,282,048 B1 * | 3/2016 | Fichter | H04L 47/25 |
| 2002/0098891 A1 | 7/2002 | Graham et al. | |
| 2002/0103698 A1 | 8/2002 | Cantrell | |
| 2002/0111865 A1 | 8/2002 | Middleton, III | |
| 2002/0165773 A1 | 11/2002 | Natsuno et al. | |
| 2003/0200145 A1 * | 10/2003 | Krassner | G06Q 30/0251 705/14.49 |
| 2005/0210533 A1 * | 9/2005 | Copeland | H04L 63/1416 726/23 |
| 2005/0235030 A1 | 10/2005 | Lauckhart et al. | |
| 2006/0026063 A1 | 2/2006 | Collins | |
| 2006/0080681 A1 | 4/2006 | Anwar et al. | |
| 2007/0050251 A1 | 3/2007 | Jain et al. | |
| 2007/0255702 A1 | 11/2007 | Orme | |
| 2007/0266305 A1 | 11/2007 | Cong et al. | |
| 2008/0004958 A1 | 1/2008 | Ralph et al. | |
| 2008/0114709 A1 | 5/2008 | Dixon | |
| 2008/0120165 A1 | 5/2008 | Yan | |
| 2008/0320125 A1 | 12/2008 | O'Sullivan et al. | |
| 2009/0076899 A1 | 3/2009 | Gbodimowo | |
| 2009/0150500 A1 * | 6/2009 | Kumar | H04L 12/58 709/206 |
| 2009/0157813 A1 | 6/2009 | Jung et al. | |
| 2009/0187546 A1 | 7/2009 | Whyte | |
| 2009/0216621 A1 | 8/2009 | Anderson | |
| 2009/0265243 A1 | 10/2009 | Karassner et al. | |
| 2009/0271260 A1 | 10/2009 | Sharma et al. | |
| 2010/0023868 A1 | 1/2010 | Bonforte et al. | |
| 2010/0095317 A1 | 4/2010 | Toebes et al. | |
| 2010/0121676 A1 | 5/2010 | Jackson | |
| 2010/0146380 A1 | 6/2010 | Rousso et al. | |
| 2010/0169792 A1 | 7/2010 | Ascar et al. | |
| 2010/0241597 A1 | 9/2010 | Chen et al. | |
| 2010/0251128 A1 | 9/2010 | Cordasco | |
| 2010/0287054 A1 | 11/2010 | Zohar et al. | |
| 2010/0295774 A1 | 11/2010 | Hennessey | |
| 2010/0310175 A1 | 12/2010 | Holt | |
| 2011/0029393 A1 | 2/2011 | Apprendi et al. | |
| 2011/0072131 A1 | 3/2011 | Zohar et al. | |
| 2011/0125587 A1 | 5/2011 | Netzer et al. | |
| 2011/0137737 A1 | 6/2011 | Baird et al. | |
| 2011/0163971 A1 | 7/2011 | Wagner et al. | |
| 2011/0239243 A1 | 9/2011 | Dierks et al. | |
| 2011/0320286 A1 | 12/2011 | Zohar et al. | |
| 2012/0078707 A1 | 3/2012 | Ramakrishnan et al. | |
| 2012/0106793 A1 | 5/2012 | Gershenson et al. | |
| 2012/0239489 A1 * | 9/2012 | Peretti | G06Q 30/02 705/14.45 |
| 2012/0284738 A1 * | 11/2012 | Narasimhan | H04H 20/38 725/16 |
| 2012/0317472 A1 | 12/2012 | Chernysh | |
| 2012/0324098 A1 | 12/2012 | De Jager et al. | |
| 2013/0031470 A1 | 1/2013 | Daly, Jr. et al. | |
| 2013/0124342 A1 | 5/2013 | Virkar et al. | |
| 2013/0179767 A1 | 7/2013 | Bajric et al. | |
| 2013/0205314 A1 | 8/2013 | Ramaswamy et al. | |
| 2013/0238423 A1 * | 9/2013 | Pottjegort | G06Q 30/0246 705/14.45 |
| 2013/0335576 A1 | 12/2013 | Gotschlich | |
| 2014/0040786 A1 | 2/2014 | Swanson et al. | |
| 2014/0181634 A1 | 6/2014 | Compain | |
| 2014/0282642 A1 | 9/2014 | Needham et al. | |
| 2015/0066940 A1 | 3/2015 | Fernandes et al. | |

OTHER PUBLICATIONS welovead.com WELOVEAD, availlable on Mar. 7, 2011 <http://web.archive.org/web/20110307041600/http://www.welovead.com/en/works/database>.

* cited by examiner

SYSTEM AND METHOD FOR DYNAMICALLY CONTROLLING SAMPLE RATES AND DATA FLOW IN A NETWORKED MEASUREMENT SYSTEM BY DYNAMIC DETERMINATION OF STATISTICAL SIGNIFICANCE

CROSS-REFERENCE TO RELATED APPLICATIONS

The present application is a continuation under 35 U.S.C. §120 of U.S. patent application Ser. No. 14/205,115, entitled "System and Method for Dynamically Controlling Sample Rates and Data Flow in a Networked Measurement System by Dynamic Determination of Statistical Significance," filed on Mar. 11, 2014, and also claims the benefit under 35 U.S.C. §119(e) of U.S. Provisional Application Ser. No. 61/785,930, entitled "System and Method for Dynamically Controlling Sample Rates and Data Flow in a Networked Measurement System by Dynamic Determination of Statistical Significance," filed on Mar. 14, 2013, the entire contents of each of which are incorporated herein by reference.

BACKGROUND OF THE INVENTION

1. Field of the Invention

The present invention relates to determining advertising ("ad") and content visibility and other indications of attention to or engagement with advertising or content both within servers, and on network connections. In particular, the present invention relates to computer systems and methods for measuring user behavior on web-connected devices and dynamically controlling sample rates and data flow in a networked measurement system by dynamic determination of statistical significance or statistical characteristics (e.g. threshold). Consumer and media behaviors are sampled to gather information, which is transmitted to a downstream analytics system.

2. Description of the Related Art

The Internet and other types of on-line communication have become increasingly popular to the point where they now compete with traditional media such as print media and broadcast media for the attention of users. Due to the extra large amount of web pages available for users to view worldwide, online content creation and publication have become a huge business.

Yet, the data flows created by millions of browsers and display advertisements being sampled simultaneously are significant, costly, and push the capacity of current technology to its limits.

It is therefore advantageous to have a way to reduce or regulate data flows in parts of the systems of the current technology. Although on the surface, one solution may be to reduce the sample rates for samples of user and media behaviors to reduce the amounts of data flow to the analytic servers, and within the analytic servers. However, reducing sample rates also results in statistical inaccuracy, thereby compromising the overall integrity of the systems and methods involved with the data flow.

It would therefore be advantageous to limit aggregate data flows from distributed browsers and within servers by limiting sample rates in a way that maintains sufficient statistical significance, thereby not impacting the integrity of the systems and methods. Yet, this goal has been difficult to accomplish because raw data is gathered from thousands, if not millions of different locations concurrently. Yet the results of testing for significance are normally based on the aggregate number of samples for a particular element that is to be sampled.

SUMMARY OF THE INVENTION

In one innovative aspect, the present invention provides a system and methods for measuring user behavior and engagement with online content including online content with advertising on web-connected devices and dynamically controlling sample rates and data flow in a networked measurement system by dynamic determination of statistical significance or characteristics (e.g., a threshold). In some implementations, a threshold is determined by a statistical fit to an ideal distribution. In some implementations, a threshold may be determined based on assessing a required capacity of downstream computers or servers. In some instances, a threshold may be determined by using both criteria in combination. Consumer (user or client) and media behaviors are sampled at varying rates to gather information, which is transmitted to a downstream analytics system for determining the sample rates needed to attain statistical accuracy for an unlimited number of scripts concurrently executed on hundreds of millions of concurrently rendering web pages operating an unlimited number of advertisements. The system and methods advantageously create a way to balance the communication flow and load among servers and browsers engaged in advertisement viewing, to a desired aggregate level, by controlling the sample rates for samples being created on all operating browsers, and the sampling of data that has already been-collected or gathered within the user-behavior analytic server itself.

In another innovative aspect, the system and methods of the present invention sample data in real time by a script that is operated on each browser or application. In one implementation, the system and methods include a decision capability within the script to allow it to operate autonomously and refrain from sending sampling data to the downstream analytic servers (e.g., statistical analytics or user-behavior measurement servers) if instructed by another computer. It should be recognized that in any situation where an instance of the script running on one web page does not transmit data pertaining to a sample, it is in effect lowering the sample rate. However, because no given instance of a single script operating on one device has the ability to view all instances of all elements being sampled (for example, advertisements, publishers, users etc.), an instance on each device normally must interrogate an analytic server to determine if it is required to send data, and if so, identify the data that needs to be sent. It should be recognized that these tasks maintain statistical significance for the element being sampled. In accordance with the present invention, the script transmits only a named subset of the data it would normally produce in a sample. This unique capability is significant and advantageous because it configures varying control over data flow, and it configures the system and methods to record data about situations relative to which no sample was obtained.

In accordance with yet another innovative aspect, a browser running a script may make an independent determination not to send data to a statistical or user-behavior analytics server, without receiving information from it. In such instances, the script may have viewed a particular advertisement enough times in a given instance of its execution to be reasonably certain that additional samples will not impact statistical significance.

In accordance with still another aspect of the present invention, the script is configured in advance with the sample rate by a preset (hard-coded) instruction in the script. Alternatively, the script may be configured to be informed of it. In such implementations, the script is not required to communicate with the user-behavior analytics server about its sampling behavior.

In all implementations in accordance with the present invention, no matter how the script receives or is apprised of the desired sample rate, the script randomizes among relevant objects to sample (for example, advertisements) to accomplish the desired sample rate.

Yet another aspect of the present invention is a capability of the analytics server (e.g., statistical or user-behavior measurement system) to determine whether to adjust or lower sample rates based on inbound communication that is received, data processing, or evaluating other capacity constraints that may relate to the aggregate flow of data from various scripts operating on browsers, to the analytic servers (e.g., statistical analytics or user-behavior measurement servers).

In some implementations of the present invention, the script behavior is configured or controlled, by programming, to determine the information at every invocation, to be sent to a computing device for analysis (e.g., statistical analytics or user-behavior measurement servers). In a similar vein, the computing device is also configured or controlled, by programming, to determine the data to be sent for further analysis, downstream in the networked environment. The mechanisms of the present invention inform processes of the optimal sample rate that balance processing and network costs with statistical significance. In some implementations, samples are weighted in downstream processing, by applying the multiplicative inverse of the net sample rate, taking into account the sampling occurring on either or both of the statistical analytics server and the browsers.

The system and methods of the present invention may be implemented on one or more computer program products and may provide a user interface for display to a user, wherein the user interface enables users to use tools to view advertising and otherwise provide data that may be used for sampling.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF EMBODIMENTS

Figure 1:
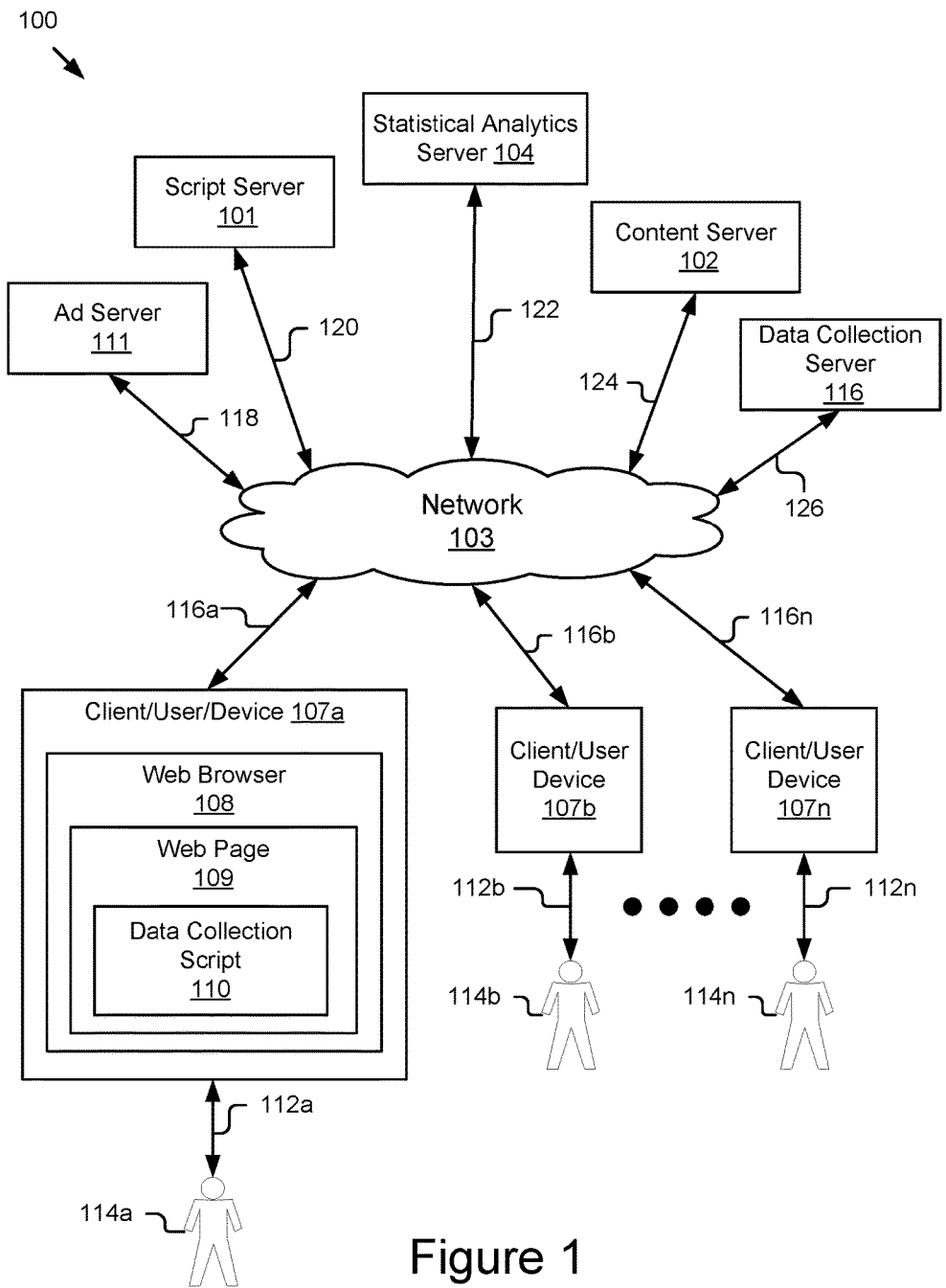
FIG. 1 is a block diagram illustrating an embodiment of a system for dynamically controlling sample rates and data flow in a networked measurement system by dynamic determination of statistical significance in accordance with the present invention.

FIG. 1 illustrates a block diagram of one embodiment of the system 100 for dynamically controlling sample rates and data flow in a networked measurement system by dynamic determination of statistical significance or characteristics (e.g., a threshold). Consumer and media behaviors are sampled to gather information, which is transmitted to a downstream analytics system of the present invention. In some implementations, a threshold may be determined by a statistical fit to an ideal distribution. In some implementations, a threshold may be determined based on assessing required or possible capacity levels determined for downstream computers or servers. In some instances, a threshold may be determined by using both criteria in combination.

The system 100 dynamically controls sample rates and data flow of online content including online content with one or more advertisements. The system and methods of the present invention described here either utilize or are operated on one or more computing systems (with one or more computers, processors, and data storage devices) that are configured to communicate in a distributed environment. For many examples described in the specification below, online content can be any text, picture or video created and/or published by publishers on web pages which are accessible to users. Furthermore, for many examples in the specification below, an online advertisement ("ad") is any text, picture or video whose purpose is advertising communication including any flash asset, any image of Internet Advertising Board (IAB) or industry standard width and height that is clickable including any recursion into iframes from the original page.

The illustrated system 100 includes a script server 101, a content server 102, an ad server 111, a statistical analytics server 104, a data collection server 116, and one or more client devices 107a-107n that are accessed by users indicated by reference numerals 114a-114n. In the illustrated embodiment, these entities are communicatively coupled via a network 103. Although only three client devices 107a-n are illustrated, it should be recognized that any number of client devices 107n are available to any number of users 114n. Furthermore, while only one network 103 is coupled to the script server 101, the content server 102, the statistical analytics server 104, the ad server 111, the data collection server 111, and the one or more client devices 107a-107n, in practice any number of networks 103 can be connected to these entities. In one embodiment, the script server 101, the training rules server 106, the analytics server 104, the content server 102 and the ad server 111 are hardware servers including a processor, memory, and network communication capabilities.

The system 100 advantageously samples data in real time by a data collection script 110 that runs on each web browser 108 or application on any client or user's device 107a, 107b, or 107n. This data collection script 110 may be installed on each browser or application and is configured with a capability to stop or not send data to any downstream analytic servers (e.g., the statistical analytics server 104) upon receiving instructions from another computer. In any situation where an instance of the data collection script 110 running on one web page 108 does not transmit data pertaining to a sample, it in effect lowers the sample rate. No given instance of the data collection script 110 has the ability to view all instances of every single element being sampled (for example, advertisements, publishers, users etc.), hence any instance in the data collection script 110 must interrogate the statistical analytic server 104 to determine if it is required to send data, and identify the data that must be sent, in order to maintain statistical significance for that element. In addition, the data collection script 110 can transmit only a subset of the data as a sample that is identified for it. With this capability, the system of the present invention exercises varying control over data flow and records data on situations in which no samples are taken.

A web browser 108 running a data collection script 110 is configured to make an independent decision to not send data in instances where it does not receive information from the statistical analytics server 104. For such instances, the data collection script 110 must have seen a particular advertisement (or other online content) displayed enough times in a given instance of its execution to be reasonably certain that obtaining additional samples will not impact statistical significance. In other instances, the data collection script 110 may be configured with a preset (hard-coded) instruction in the data collection script 110, which informs on the sample rate. In this particular implementation, the data collection script does not need to communicate with the statistical analytics server 104 regarding its sampling behavior. In all the implementations, regardless of how the data collection script 110 is configured to receive the desired sample rate, the data collection script 110 is configured to randomize among relevant objects to sample (normally advertisements) such that the desired sample rate is accomplished.

In operation, the data collection script 110 configured to run on a web page 109, rendering in the browser 108 on a client device 107 a-n, is loaded from the script server 101, and begins to execute. The data collection script 110 once loaded, first finds objects of interest on the web page 109. These objects of interest could be advertisements or other content elements. Derived characteristics of the content elements, for example, "in-view time," "in-view rate," etc., are taken as numerical samples. It should be recognized that any one of several metrics may be sampled and those that are referred to here are by example.

The data collection script 110 is configured to determine if sampling is required, by attempting to access a document provided by the content server 102 connected to the network 103 and containing instructions and recommended sample rates. In the event no document is returned, the data collection script 110 uses a "default" sample rate, which is embedded into the data collection script programming itself. If the "default" sample rate is determined to be 100%, then no sampling may be required for the time being. In the event sampling is required, the data collection script 110 is configured to randomly select objects to measure from the objects of interest discovered at a rate corresponding to the sample rate. For example, if the sample rate is determined to be 10%, then $1/10^{th}$ of the available objects are sampled. The objects to be sampled are selected by a random number.

After the data collection script 110 writes data to the statistical analytics server 104, it may decide to further sample data, as it is aware of its own capacity.

In some implementations, the statistical analytics server 104 is configured to determine whether it needs to lower sample rates based on inbound communication, data processing, or other capacity constraints related to the aggregate flow of data from data collection scripts 110 (on the various client or user devices 107a-17n) running on web browsers 108 to the statistical analytic servers 104.

The network 103 is a conventional type, wired or wireless, and may have any number of configurations such as a star configuration, token ring configuration or other configurations. Furthermore, the network 103 may comprise a local area network (LAN), a wide area network (WAN) (e.g., the Internet), and/or any other interconnected data path across which multiple devices may communicate. In yet another embodiment, the network 103 may be a peer-to-peer network. The network 103 may also be coupled to or includes portions of a telecommunications network for sending data in a variety of different communication protocols. In yet another embodiment, the network 103 includes Bluetooth communication networks or a cellular communications network for sending and receiving data such as via short messaging service (SMS), multimedia messaging service (MMS), hypertext transfer protocol (HTTP), direct data connection, WAP, email, etc.

The client device 107a is representative of client devices 107a-107n and is a conventional type of computing device, for example, a personal computer, a hardware server, a laptop computer, a tablet computer, or smart phone. The client devices 107a-107n, are coupled to the network 103 by signal lines 116a, 116b-116n, respectively. In one embodiment, the client device 107 is coupled to receive (e.g., download or otherwise view) content with online advertisements from the ad server 111 and other content from publishing sites or third party servers (not shown) but coupled in the illustrated distributed environment. The client device 107 includes the web browser 108 for presenting web pages 109 including online content and advertisements to the user or client 114a, 114b, through 114n for viewing on their respective client devices 107a-107n. The web browser 108 on each of the client or user device 107a-107n presents advertisements and other online content, and receives input from the user or client 114a-114n as represented by signal lines 112a-112n. The signal lines 112a-112n represent interactions of the users, 114a-114n, with their respective devices 107a-17n (e.g., viewing or manipulating tools to receive or control viewing of the online content). The web browser 108 and the data collection script 110 are operable on the client devices 107a through 17n.

In one embodiment, the data collection script 110 may be embedded on the web browser 108 by the script server 101. In another embodiment, the data collection script 110 may be placed on the web browser 108 by the ad server 111. In yet another embodiment, the data collection script 110 may be embedded on the web browser 108 by the content server 102.

The script server 101 is a computer program running on a hardware system for providing one or more data collection scripts 110 (configured to determine or measure user behavior of visibility of online advertisement content) to web pages 109. For example, the script server 101 may be a web server that creates and provides data collection scripts for publishers to place the scripts on web browsers 108. In one embodiment, the script server 101 may provide the data collection script 110 to a publisher that places the data collection script 110 on a web browser 108 that provides a web page containing content including advertisements for viewing by users or clients 114a-114n. In another embodiment, the ad server 111 is used to place the data collection script 110 on the web browser 108. In yet another embodiment, the content server 102 is used to place the data collection script 110 on the web browser 108. The script server 101 is coupled to the network 103, by signal line 120, for providing data collection scripts 110 to be placed on the web browsers 108.

The statistical analytics server 104 is a computer program running on a hardware system for dynamically controlling sample rates and data flow in the networked system by dynamic determination of statistical significance or characteristics. Consumer and media behaviors are sampled to gather information, which is transmitted to the statistical analytics server 104. For example, the statistical analytics server 104 may be a web server that receives samples of data obtained by the data collection script 110 operating on the client devices 107*a*-107*n*. The statistical analytics server 104 is coupled to the network 103, by signal line 122, for communication with the other components of the system 100.

The ad server 111 is a computer program running on a hardware system for placing advertisements on web sites and/or placing the data collection script 110 on web pages 109. For example, the ad server 111 may be a web server that receives advertisements from the ad preparation server or the advertising asset server (not shown) and delivers them to users or clients (114*a*-114*n*) or viewing websites. The ad server 111 is coupled to the network 103 by signal line 118 for receiving ads from the ad preparation server or the advertising asset server (not shown) and for delivering the ads to third party servers, sites or domains (not shown).

The content server 102 is a computer program running on a hardware system for placing content on web sites and/or placing the data collection script 110 on web pages 109. For example, the content server 102 may be a web server that provides the data collection script 110 for publishers to place the data collection script 110 on web browsers 108. The content server 102 is coupled to the network 103 by signal line 124 for communication with the other components of the system 100.

The data collection server 116 is a computer program running on a hardware system for collecting data flow of samples that are obtained by the data collection scripts 110. For example, the data collection server 116 may be a web server that receives and gathers sample data flow from various components in the distributed environment. The data collection server 116 is coupled to the network 103, by signal line 126, for communication with the other components of the system 100.

Figure 2A:
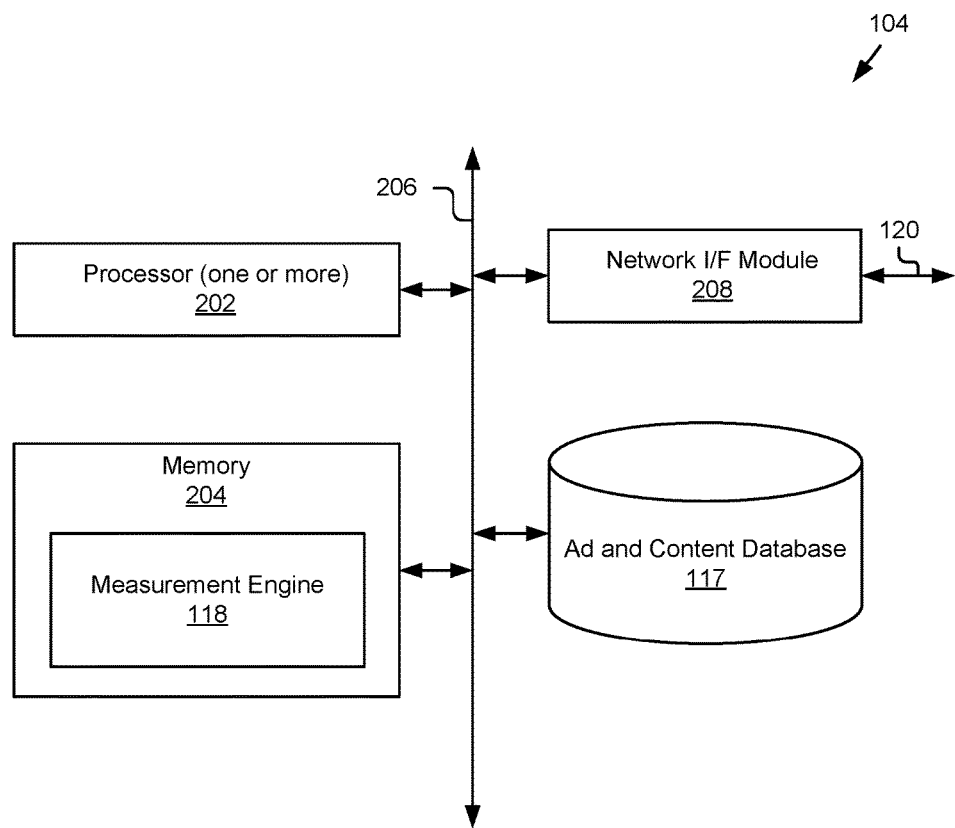
FIG. 2A is a block diagram illustrating various hardware components of an example user-behavior analytics server in accordance with the present invention.

FIG. 2A is a block diagram of example hardware components of the statistical analytics server 104 (or a server dedicated to determine or measure user-behavior on web-connected devices for viewing advertisement online content). In this embodiment, the statistical analytics server 104 comprises: a processor 202, memory 204 with a measurement engine 118, a network I/F module 208, an ad and content database 117, and a bus 206. The processor 202 comprises an arithmetic logic unit, a microprocessor, a general-purpose controller or some other processor array to perform computations and provide electronic display signals to a display device. The processor 202 is coupled to the bus 206 for communication with the other components via a signal line. The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 204 stores instructions and/or data that may be executed by the processor 202. The memory 204 is coupled to the bus 206 via a signal line for communication with the other components via a signal line. The instructions and/or data may comprise code for performing any and/or all of the techniques described herein. The memory 204 may be a dynamic random access memory (DRAM) device, a static random access memory (SRAM) device, flash memory or some other memory device.

The network I/F module 208, as illustrated, is coupled to network 103, by a signal line, and is coupled to the bus 206. The network The network I/F module 208 includes ports for wired connectivity such as but not limited to USB, SD, or CAT-5, etc. The network I/F module 208 links the processor 202 to the network 103 that may in turn be coupled to other processing systems. The network I/F module 208 is configured to provide other connections to the network 103 using standard network protocols such as TCP/IP, HTTP, HTTPS and SMTP. In other embodiments, the network I/F module 208 includes a transceiver for sending and receiving signals using Wi-Fi, Bluetooth® or cellular communications for wireless communication. The network interface (I/F) module 208 provides a communication path for the components of the client device 107*a-n* to the network 103 and other systems.

The Ad and Content database 117 is data storage for storing content and other data as illustrated in further detail with reference to FIG. 7. The Ad and Content database 117 is coupled to the bus 206. The Ad and Content storage 117 stores data, information and instructions used by the processor 202. Such stored information includes information about users, publishers, ads, assets and other information. In one embodiment, the Ad and Content storage 117 stores data received by the processor 202 as well as data generated during intermediate processes. In one embodiment, the Ad and Content database 117 is of conventional type. The Ad and Content database 117 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The Ad and Content database 117 is coupled by the bus 206 via a signal line for communication with other components. The Ad and Content database 117 will be described in further detail below with reference to FIG. 7.

Figure 2B:
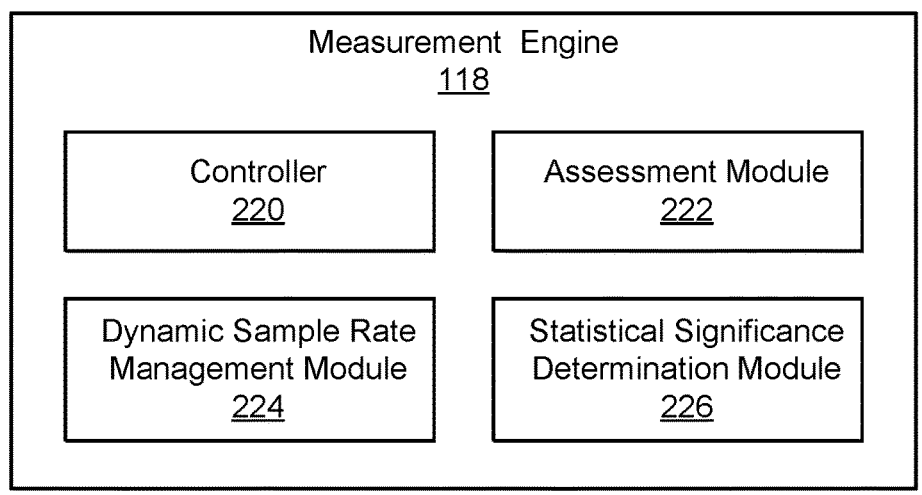
FIG. 2B is a block diagram illustrating various software components of the example user-behavior analytics server in accordance with the present invention.

FIG. 2B is a block diagram illustrating example software components of the measurement engine 118 of the statistical analytics server 104, including a controller 220, an assessment module 222, a dynamic sample rate management module 224, and a statistical significance determination module 226.

The controller 220 is software, code or routines for handling communications between the measurement engine 118 and other components of the statistical analytics server 104. For example, the controller 220 is coupled to receive sample data from the data collection script 110 and deliver the sample data to one or more other modules of the measurement engine 118, e.g., the assessment module 222. In one embodiment, the controller 220 receives communication data from one or more other modules of the measurement engine 118 and sends, via the network I/F module 208 (FIG. 2A), the communication data to the next entity.

The controller 220 is coupled to the bus 206 (FIG. 2A) for communications with other components of the statistical analytics server 104.

The assessment module 222 is software, code or routines for assessing sample data that is received. The assessment module 222 is coupled by the network 103 to one or more client devices 107a-107n and thus one or more data collection scripts 110. Each of the one or more data collection scripts 110 sends sample data to the measurement engine 118 and the sample data is transmitted to the assessment module 222 via the controller 220. In some embodiments, the assessment module 222 processes the sample data. The assessment module 222 of the measurement engine 118 makes periodic assessments of its capacity versus demand and determines, on its own, sample rates that are required, according to the same algorithms used by the data collection script 110. It should be recognized that the difference is only that the statistical analytics server 104 is always operating and always aware of its own capacity, and therefore, it can dynamically reduce the sample rate according to its own assessed needs. The statistical analytics server 104 is configured to attenuate its own input, by either sampling at its own input, or instructing the distributed elements, for example, the web browsers 108 to lower their sample rates. For purpose of this specification, it should be recognized that statistical significance is a function of the number of observations/samples taken in a known universe representing a population of objects to measure. The assessment module 222 of the measurement engine 118 of the statistical analytics server 104 is aware of the sample rates of data it receives, and can therefore, it can assess whether to sample further, or not, depending on the number of samples required for statistical validity.

The dynamic sample rate management module 224 is software, code or routines for managing the sample rates as the need is determined by the assessment module 222. The dynamic sample rate management module 224 is coupled by the network 103 to one or more client devices 107a-107n and thus one or more data collection scripts 110. The dynamic sample rate management module 224 of the measurement engine 118 of the statistical analytics server is configured to weight samples to correct for bias in sampling that might be created by downstream processes.

The statistical significance determination module 226 is software, code or routines for determining the statistical significance or characteristics of the sampling. It should be recognized that statistical validity for the purposes of this sampling is defined as an approximate match between an actual distribution of samples taken, and an ideal distribution (e.g., represented by one or more thresholds that are determined or established), per sampled element. The statistical significance (or characteristic) determination module 226 of the measurement engine 118 of the statistical analytics server 104 periodically compares the actual distribution to the ideal distribution. If the actual distribution is either empirically or statistically different from the ideal distribution at an input "confidence" level, the sample rate is maintained or not lowered for the particular element for which the sample is being obtained.

Figure 3A:
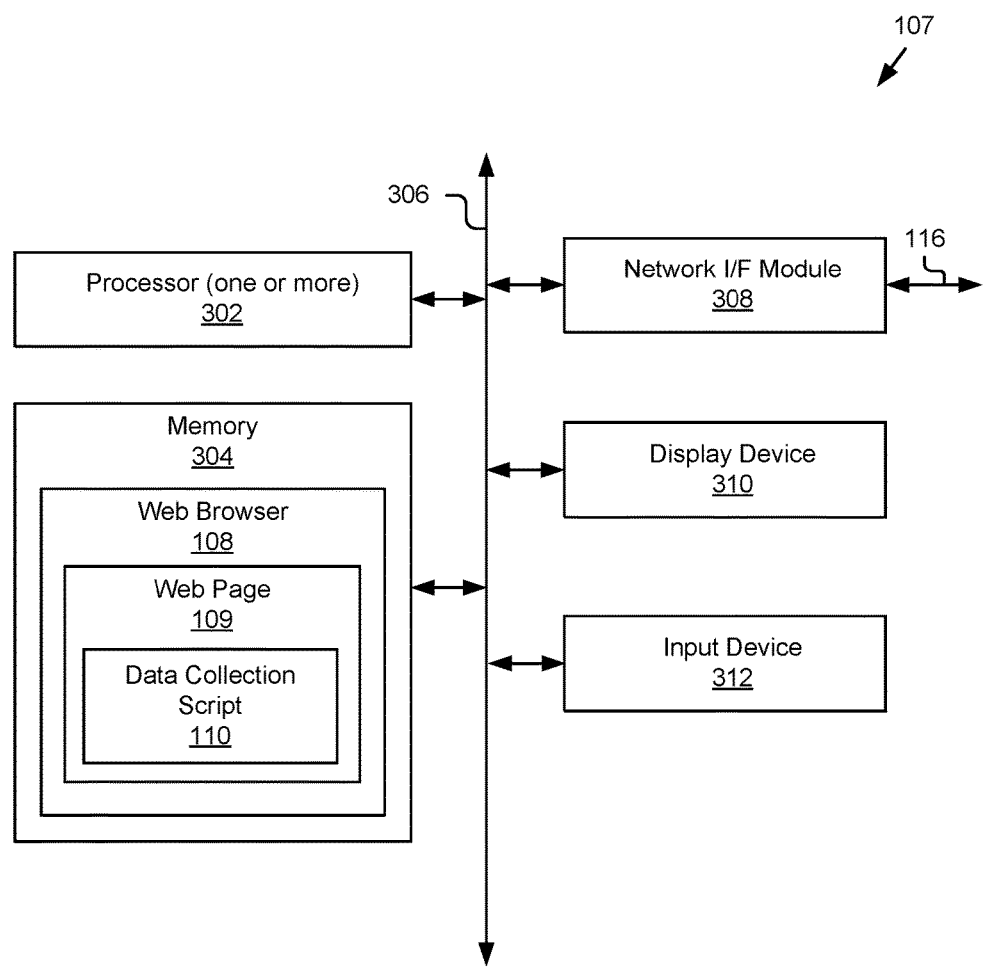
FIG. 3A is a block diagram illustrating various hardware/software components of an example client device.

Referring now to FIG. 3A, example hardware and software components of an example client device 107a-107n are illustrated. An example client device 107a-107n may be of conventional type, a computing device, for example, a personal computer, a hardware server, a laptop computer, a tablet computer or smart phone. The client devices 107a-107n, are coupled to the network 103 by signal lines 116. The client devices 107a-107n include a processor 302, memory 304, a network I/F module 308, a display device 310 on which content is displayed or clients or users 114a-114n to view, and an input device 312, via which data for the display device 310 is received.

In one implementation, the client device 107 is coupled to receive content with online advertisements from the ad server 111 and other content from publishing sites or third party servers (not shown). The client device 107 includes the web browser 108 for presenting web pages 109 including online content and advertisements to the user or client 114a, 114b, through 114n. The web browser 108 on each of the client or user device 107a-107n presents advertisements and other content, and receives input from the user or client 114a-114n. The web browser 108 and the data collection script 110 on the web page 109 are operable on the client devices 107a through 17n. In one embodiment, the data collection script 110 may be embedded on the web browser 108 from the script server 101. In another embodiment, the data collection script 110 may be placed on the web browser 108 by the ad server 111. In yet another embodiment, the data collection script 110 may be embedded on the web browser 108 by the content server 102.

The processor 302 comprises an arithmetic logic unit, a microprocessor, a general-purpose controller or some other processor array to perform computations and provide electronic display signals to a display device. The processor 302 is coupled to the bus 306 for communication with the other components via a signal line. The processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. Other processors, operating systems, sensors, displays and physical configurations are possible.

The memory 304 stores instructions and/or data that may be executed by the processor 302. The memory 304 is coupled to the bus 306 via a signal line for communication with the other components via a signal line. The instructions and/or data may comprise code for performing any and/or all of the techniques described herein. The memory 304 may be a dynamic random access memory (DRAM) device, a static random access memory (SRAM) device, flash memory or some other memory device.

The network I/F module 308 is coupled to network 103 by a signal line 116 (a-n) and coupled to the bus 306. The network I/F module 308 includes ports for wired connectivity such as but not limited to USB, SD, or CAT-5, etc. The network I/F module 308 links the processor 302 to the network 103 that may in turn be coupled to other processing systems. The network I/F module 308 is configured to provide other connections to the network 103 using standard network protocols such as TCP/IP, HTTP, HTTPS and SMTP. In other embodiments, the network I/F module 308 includes a transceiver for sending and receiving signals using Wi-Fi, Bluetooth® or cellular communications for wireless communication. The network interface (I/F) module 308 provides a communication path for the components of the client device 107a-n to the network 103 and other systems.

Figure 3B:
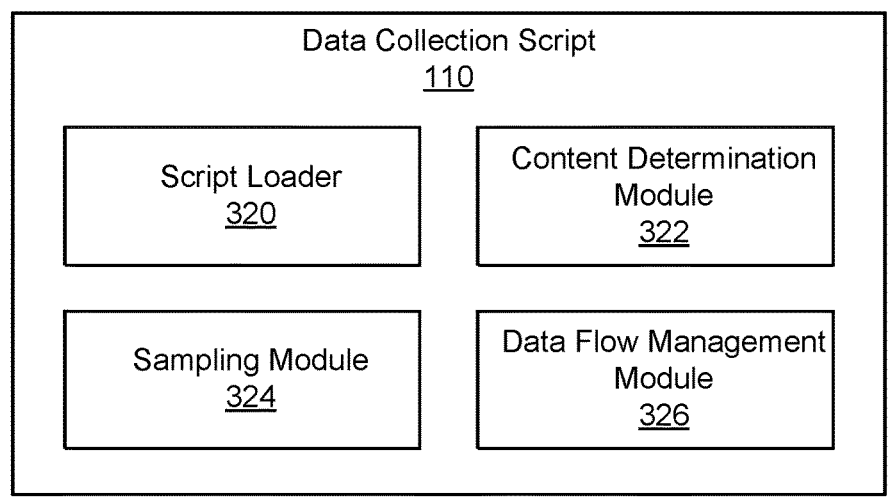
FIG. 3B is a block diagram illustrating an example data collection script.

Referring now to FIG. 3B, an example data collection script 110 is described in further detail. In the illustrated embodiment, the data collection script 110 comprises a script loader, a content determination module 322, a sampling module 324, and a data flow management module 326. As noted above, the data collection script 110 is placed by a publisher or other entity on the web browser 108 of the client device 107 from one of the script server 101, the content server 102 and the ad server 111. In some implementations, the data collection script 110 is configured to be completely autonomous in its operations. For example, the client device 107 is used by a user 114 to run a web browser 108 for opening a web page 109. The data collection script 110 is placed on the web browser 108 to collect sample data.

The script loader 320 is software, code or routines for loading the data collection script 110. For example, the script loader 320 is coupled to receive a signal indicating that a web page 109 is rendered from the web browser 108 and configured to deliver the signal to one or more entities that may be configured to load the data collection script 110. As indicated above, in operation, the data collection script 110 configured to run on a web page 109, renders in the browser 108 on a client device 107 a-n. It may be loaded by the script server 101, and begins to execute.

The data collection script 110 is configured to determine if sampling is required, by attempting to access a document provided by the content server 102 connected to the network 103 and containing instructions and recommended sample rates. In the event no document is returned, the data collection script 110 uses a "default" sample rate, which is embedded into the data collection script programming itself. If the "default" sample rate is determined to be 100%, then no sampling may be required for the time being. In the event sampling is required, the data collection script 110 is configured to randomly select objects to measure from the objects of interest discovered at a rate corresponding to the sample rate. For example, if the sample rate is determined to be 10%, then $1/10^{th}$ of the available objects are sampled. The objects to be sampled are selected by a random number.

The content determination module 322 is software, code, or routines for determining content for which sampling measurements are required, once the script is loaded. The content determination module 322 is coupled to receive a signal indicating that a web page 109 is rendered and coupled to determine content elements to be measured on this web page 109. In some implementations, the script loader 320 loads a data collection script from a script server 101 and begins to execute. The content determination module 322 of the data collection script 110 first finds objects of interest on the web page 109. These could be advertisements or content elements. Derived characteristics of the element such as "in-view time," "in-view rate," etc. are determined as the numerical samples. Any one of several metrics might be determined for sampling.

The sampling module 324 is software, code or routines for sampling data as designated, either by the dictating entity (e.g., the content determination module 322) or as hardwired within the data collection script 110. The sampling module 324 then attempts to determine if sampling is required by attempting to access a document provided either by the content server 101 or otherwise provided, containing instructions and recommended sample rates. If no document is returned by the content server 101, the sampling module 324 uses a default sample rate which in some implementations may be embedded into the programming of the data collection script 110. If the default sample rate is determined to be 100% then no sampling is required. The sampling module 324, if required to sample, randomly selects objects to measure from the objects of interest discovered at a rate corresponding to the sample rate. For example, if the sample rate is 10% then $1/10^{th}$ of the available objects are sampled. The objects to be sampled are selected by a random number.

The data flow management module 326 is software, code or routines for managing the flow of data to write data to the statistical analytic server 104 as indicated by the sampling module 324. In some instances, the statistical analytics server 104 aware of its own capacity issues may select to further sample the data.

Figure 4:
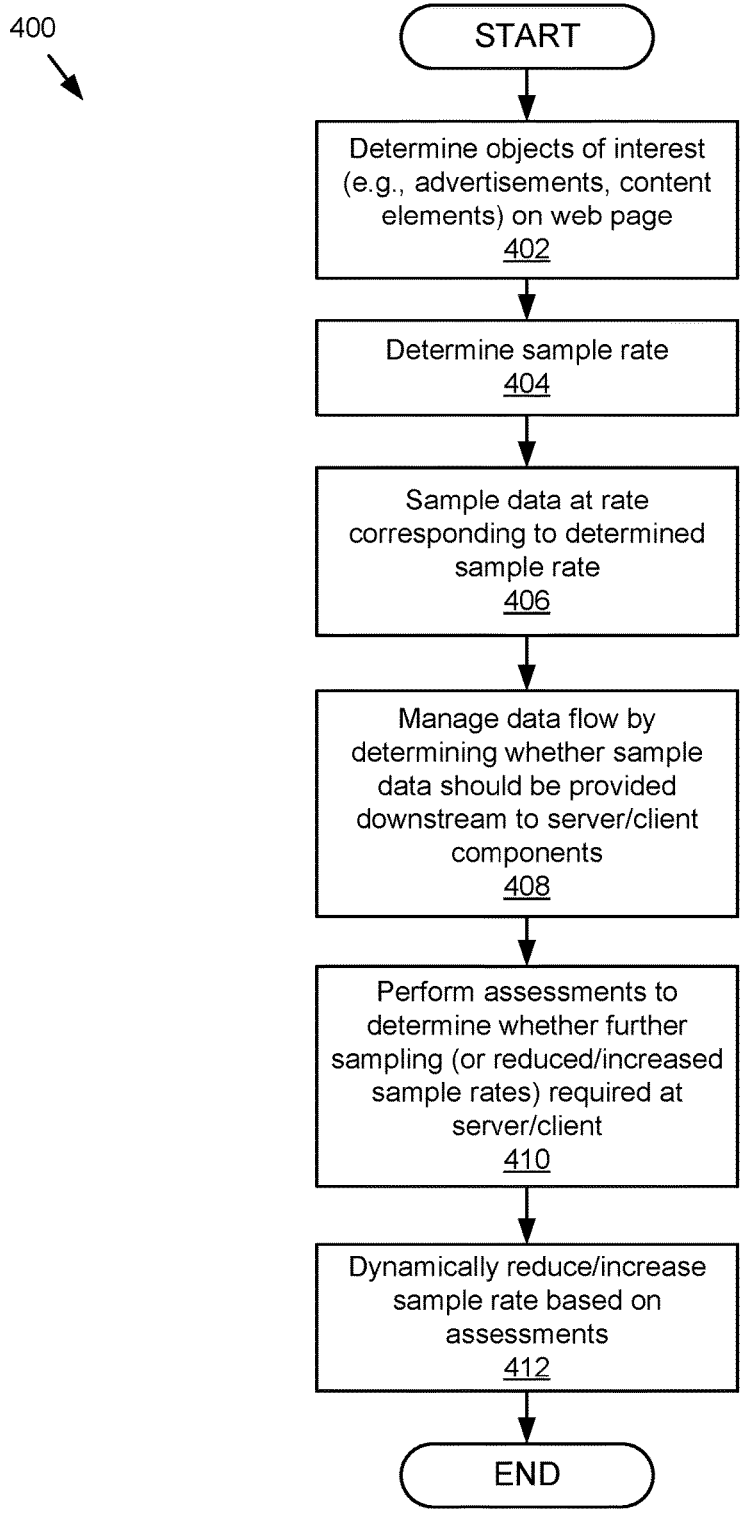
FIG. 4 is a flowchart of an example general method for dynamically controlling sample rates and data flow in a networked measurement system by dynamic determination of statistical significance in accordance with the present invention.

Referring now to FIG. 4, one embodiment of a general method 400 in accordance with the present invention, for dynamically controlling sample rates and data flow in a networked measurement system by dynamic determination of statistical significance is illustrated. The method 400 begins with one or more operations designated by block 402, for determining objects of interest (e.g., advertisements, content elements) on a web page 109 that is rendered. For example, once the web browser 108 renders a web page 109, the data collection script 110 begins to execute and receives a signal indicating that a web page 109 is rendered. The method 400 continues by one or more operations for determining the sample rate, as indicated by block 404. These operations are performed in accordance with the programming and configurations for the web page 109. The method 400 proceeds and in accordance with one or more operations designated by block 406 samples data at a rate that corresponds to the sample rate that is determined. The method 400 proceeds to the next block 408 of one or more operations or managing data flow by determining whether the sample data should be provided to one or more components. The method 400 continues to block 410 including one or more operations for performing assessments to determine whether further sampling is required or whether the sampling should be either reduced or increased. The method proceeds to the next block 412 including one or more operations for dynamically either reducing or increasing the sample rates based on the assessments. The method proceeds to an indication of "END," which is simply to illustrate an end to the sequence of operations described above. It should be recognized that the method 400 described is by way of example and it may either include additional operations not described here or exclude any of the operations that are described.

Figure 5A:
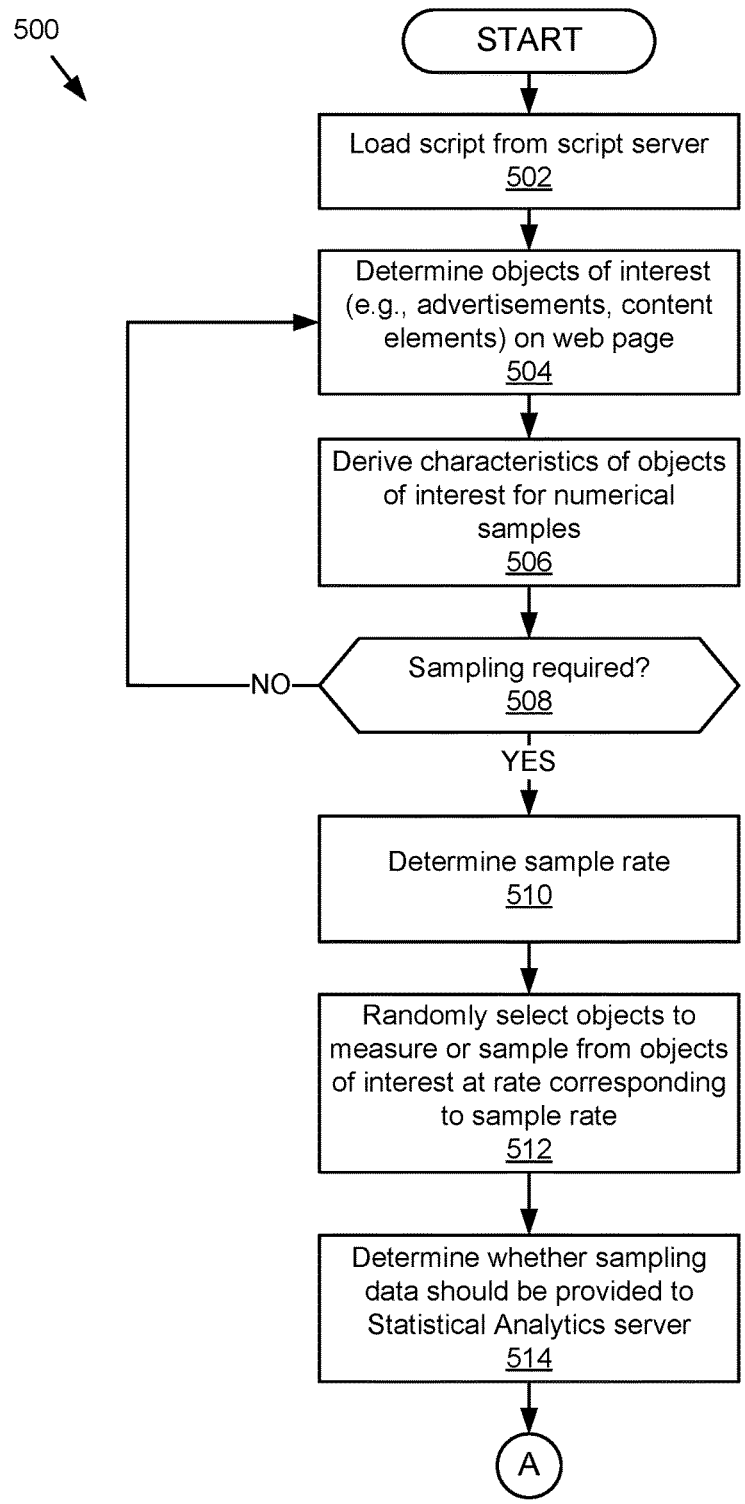
FIGS. 5A and 5B together illustrate a flowchart of an example method illustrating the sampling process as performed from the perspective of the data collection script.
Figure 5B:
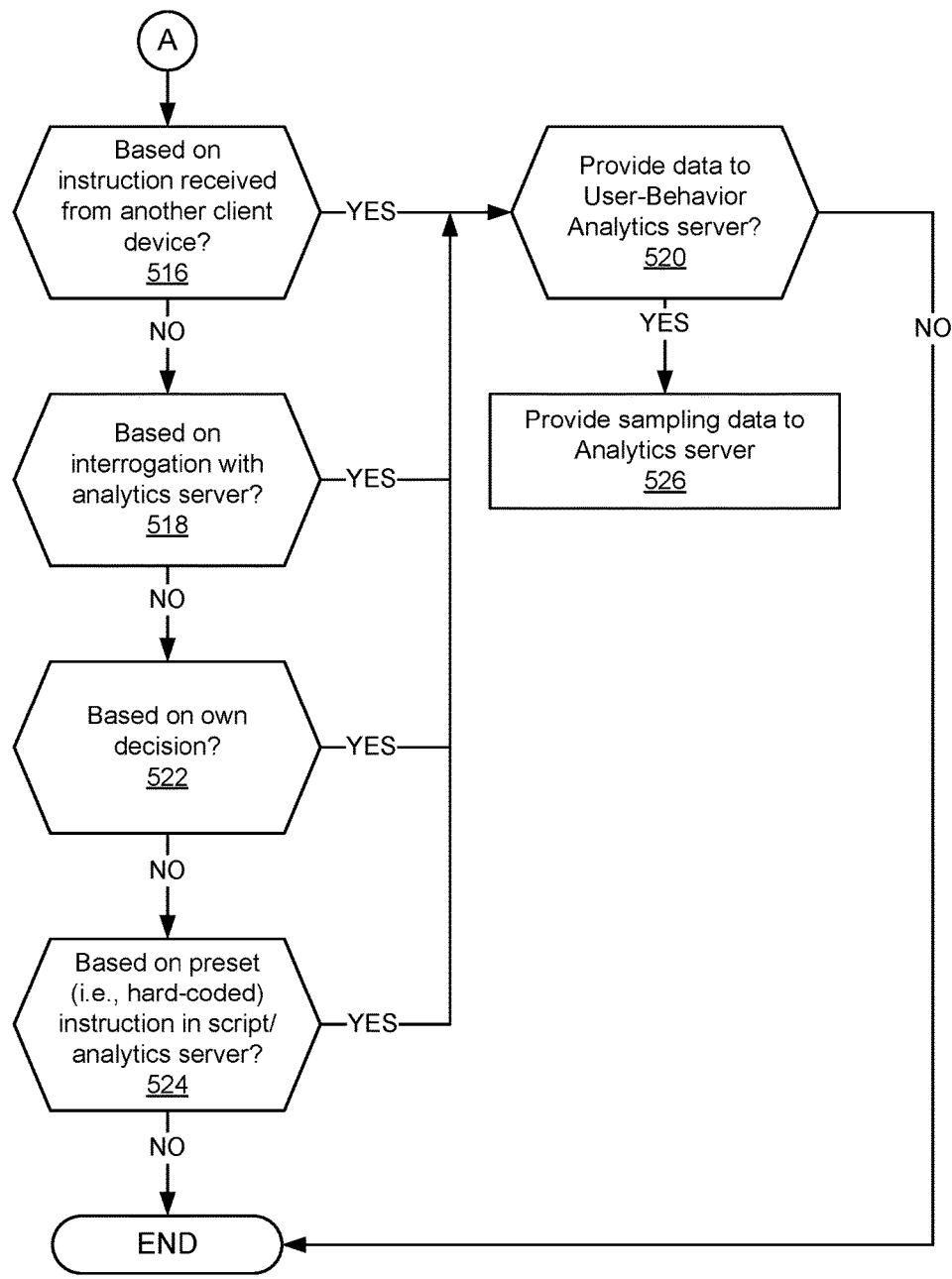

Referring now to FIGS. 5A and 5B, an example method 500 illustrating the sampling process by the data collection script 110 is illustrated and described. The method 500 begins by one or more operations designated by block 502 or loading a script (e.g., data collection script 110) from a script server (e.g., script server 101). The method 500 proceeds to the next block 504, including one or more operations for determining objects of interest (e.g., advertisements, content elements) on a web page. The method 500 proceeds to the next block 506, including one or more operations for deriving characteristics of objects of interest for numerical samples. The method 500 proceeds to a decision block 508, including one or more operations for determining if sampling is required. In the event the answer is negative, the method 500 returns to block 504 and its operations to determine objects of interest. In the event the answer at decision block 508 is affirmative, the method 500 proceeds to the next block 510 including one or more operations for determining the sample rate. The method 500 proceeds to a next block 512 including one or more operations for randomly selecting objects to measure or sample from objects of interest at a rate corresponding to a sample rate determined. From there, the method 500 proceeds to a next block 514, including one or more operations for determining whether the sampled data should be provided to the statistical analytics server. The method 500 proceeds to a connector "A," and via the connector "A," to the next FIG. 5B, where the method 500 continues.

Referring now to FIG. 5B, the method 500 proceeds to a decision block 516, including one or more operations for determining if there are instructions received from another client device (e.g., any one of 107a-107n). In the event the answer is affirmative, the method 500 proceeds to another decision block 520 including one or more operations for making a determination if data should be provided to an analytics server (e.g., statistical analytics server 104). In the event the answer is negative, the method 500 proceeds to an "END," indicating an end to this sequence of operations. In the event the answer in affirmative at the decision block 520, the method 500 proceeds to the next block 526 including one or more operations for providing sampling data to the analytics server (e.g., the statistical analytics server 104). Returning to decision block 516, in the event the answer is negative, the method 500 proceeds to the next block 518, including one or more operations for determining if sampling data should be provided to the analytics server (e.g., statistical analytical server 104), based on interrogation (or querying) of the analytics server (e.g., the statistical analytics server 104). In the event the answer is affirmative, the method 500 proceeds to decision block 520. Yet again, if the answer at the decision block 520 is negative, the method 500 proceeds to an end. If the answer is affirmative, the method 500 proceeds to the next block 526, including one or more operations for providing sampling data to the statistical analytics server (e.g., statistical analytics server 104). Returning to decision block 518, in the event the answer is negative, the method 500 proceeds to another decision block 522, including one or more operations for determining if the decision is to be made by the data collection script 110. If the answer is affirmative, the method 500 proceeds to the decision block 520 including one or more operations for determining if data should be provided to the analytics server 520. In the event the answer is negative, the method 500 proceeds to an end. In the event the answer is affirmative, the method 500 proceeds to the next block 526 including one or more operations for providing the sampling data to the analytics server. Returning to decision block 522, in the event the answer at decision block 524 is negative, the method proceeds to another decision block 524, including one or more operations for determining if sampling should be performed based on preset (i.e., hard-coded) instructions in the script or analytic server (e.g., data collection script 110 or statistical analytics server 104). In the event the answer is affirmative, again, the method 500 proceeds to the decision block 520, including one or more operations or determining whether sampling data should be provided to the analytics server (e.g., statistical analytics server 104). If the answer is negative, the method 500 proceeds to an end. If the answer is affirmative, the method 500 proceeds to the next block 526, including one or more operations for providing sampling data to the analytics server. Returning to decision block 524, in the event the answer is negative, the method 500 proceeds to an end. It should be recognized that the sequence of operations illustrated in FIGS. 5A and 5B are only by way of example. The sequence may be altered, or any of the operations either eliminated or substituted by similar operations. The decision blocks in FIG. 5B reflect various possibilities, either or all of which may be variously performed.

Figure 6:
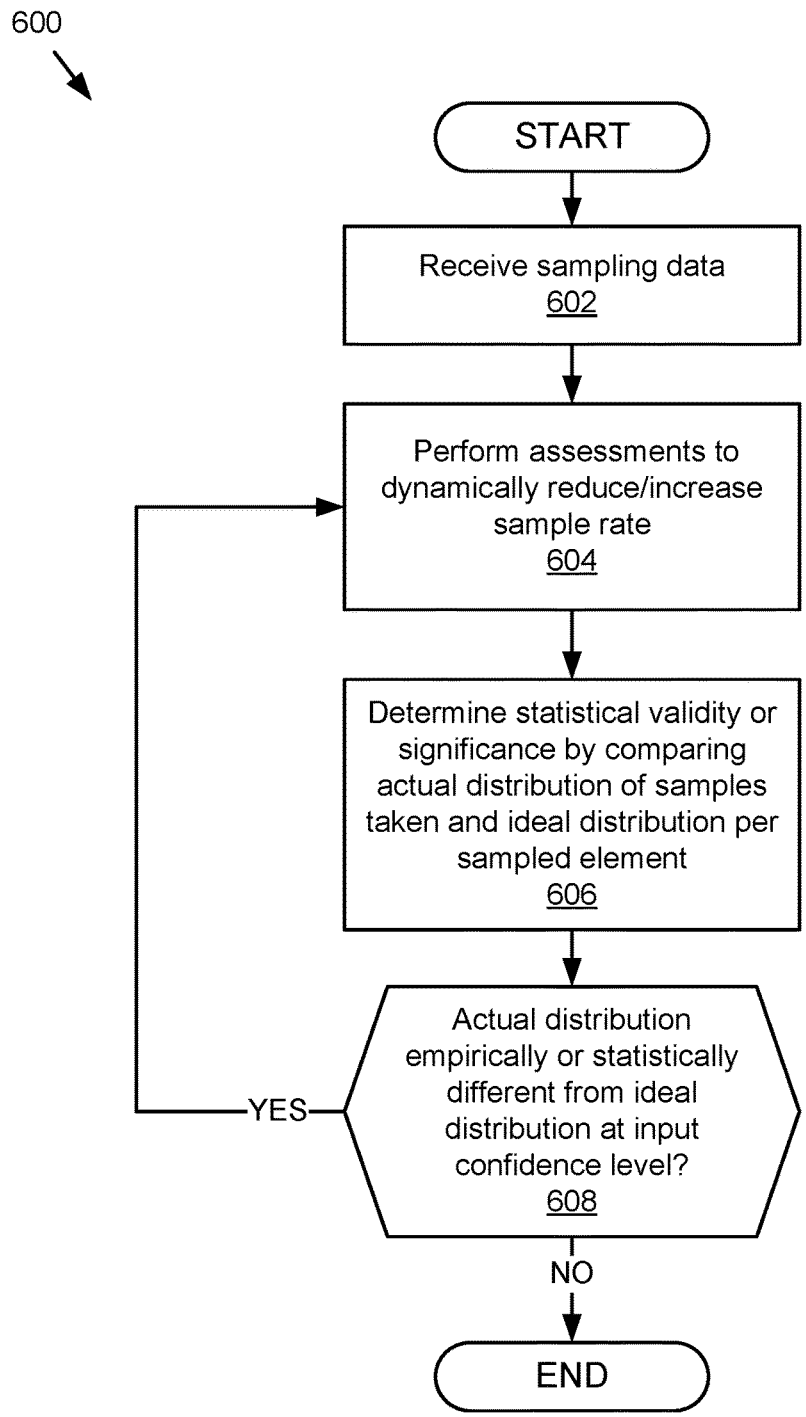
FIG. 6 is a flowchart illustrating an example method of the sampling process from a perspective of the analytic server performed in accordance with the present invention.

Referring now to FIG. 6, an example method 600 illustrating a sampling process from the perspective of an analytics server (e.g., the statistical analytics server 104) is described. The method 600 begins and proceeds to a block 602 including one or more operations for receiving sampling data. The method 600 proceeds to the next block 604 for performing assessments to determine whether further sampling (or reduced/increased sample rate) is required. The method 600 proceeds to the next block 606 including one or more operations for determining statistical validity or significance by comparing actual distribution of sample that are taken and ideal distribution per sampled element (e.g., by comparing with established or predetermined thresholds). The method 600 proceeds to the next block 608 including one or more operations for determining if the actual distribution is empirically or statistically different from ideal distribution at input confidence level. If the answer is negative, the method 600 proceeds to an End. If the answer at decision block 608 is affirmative, the method 600 returns to block 604 including one or more operations for performing assessments to dynamically reduce/increase sample rates and continues through blocks 606, and 608.

Figure 7:
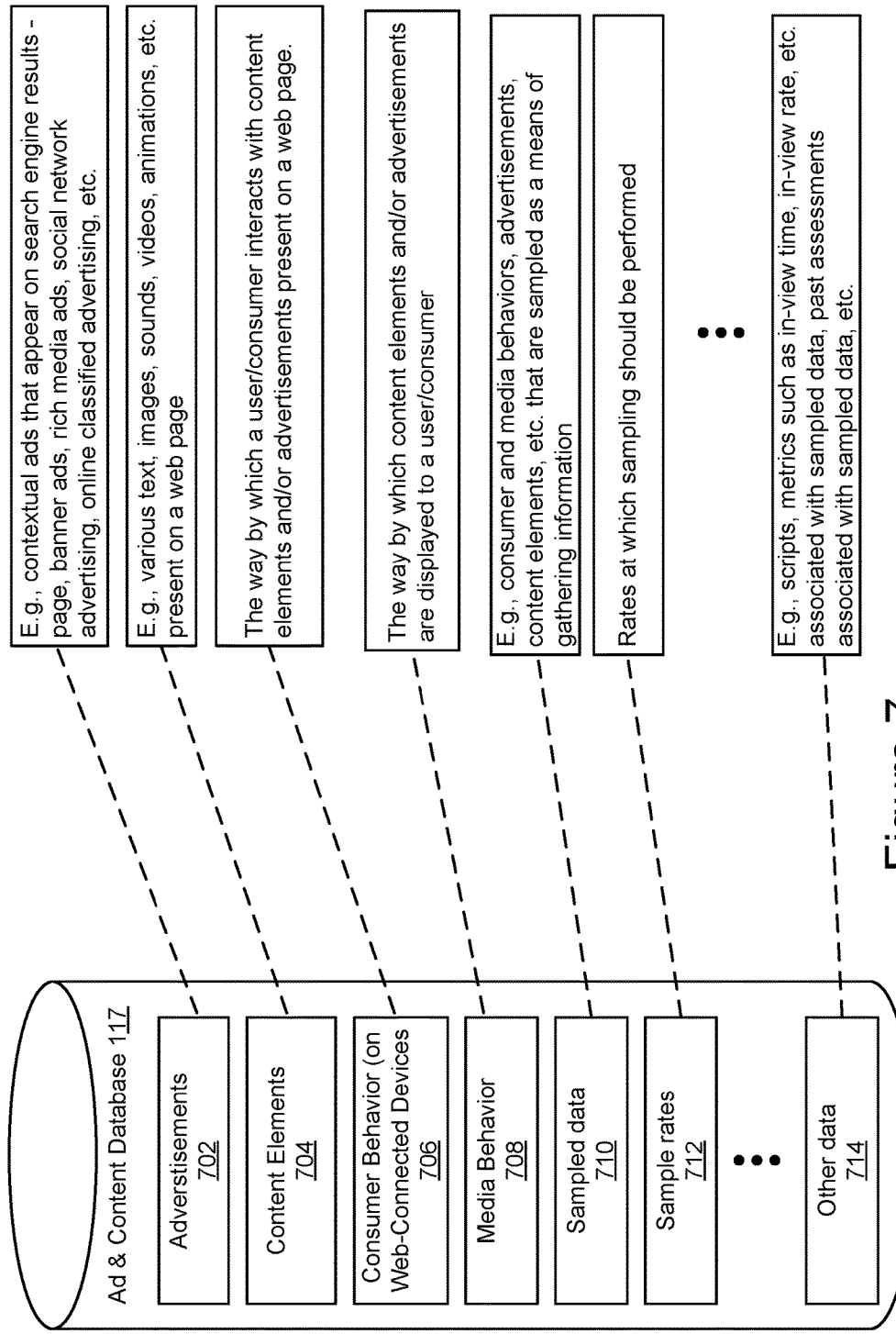
FIG. 7 is a block diagram illustrating one embodiment of data storage in accordance with the present invention.

Referring now to FIG. 7, one embodiment of an Ad and Content database 117 in accordance with the present invention is illustrated and described. The Ad and Content database 117 is data storage for storing data useful for the measurement engine 118 to perform its functionality. In the illustrated embodiment, the Ad and Content database 117 stores "Advertisements" 702, including, for example, contextual advertisements that appear on search engine results, page, banner advertisements, rich media advertisements, social network advertising, online classified advertising etc. The Ad and Content database 117 also includes "Content Elements" 704, "Consumer Behavior (on Web-Connected Devices)" 706, "Media Behavior" 708, "Sampled data" 710, and "Sample rates" 712 and other types of data indicated by reference numeral 714. Examples of content elements 704 are various text, images, sounds, videos, animations, etc., which are present on a web page. Examples of consumer behavior 708 include the way by which a user, client, or consumer, interacts with content elements and/or advertisements present on a web page 109. Examples of media behavior 708 include the way by which content elements and/or advertisements are displayed to a user/consumer. Examples of sampled data 710 include consumer and media behaviors, advertisements, content elements, etc., that are sampled as a means of gathering information. The sample rates 712 include rates at which sampling should be performed. Examples of other data include scripts, metrics such as "in-view time," "in-view rate" etc., associated with sampled data etc.

Systems and methods for measuring user behavior on web-connected devices are described here. The systems and methods determine advertising ("ad") and content visibility and other indications of attention to or engagement with advertising or content both within servers, and on network connections. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of the Internet and on-line advertising; however, the disclosed technologies apply to other types of advertising.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:
1. A method implemented by one or more servers coupled to a network, for dynamically adjusting sample rates of variables relating to attention by users to a webpage, the webpage displayed on a plurality of user devices concurrently connected, by the network, to a website displaying the webpage, the method comprising:
designating, by at least one server, a desired sample rate by determining one or more statistical characteristics of aggregated data derived from gathering sample data relating to attention by each of a plurality of users to online content on the webpage, wherein the online content is at least one of text, picture and video;

monitoring, by at least one server, aggregated data flows from the plurality of user devices to determine if current new information for particular online content is required for statistical accuracy, wherein the monitoring is at least in part by a sample data collection script placed in the plurality of user devices;

assessing the impact of the aggregated data flows, by at least one server, on a downstream analytic server; and adjusting the aggregated data flows, by at least one server, by changing sample rate parameters for measurement scripts provided to the plurality of user devices.

2. The method of claim 1, wherein if the aggregated data flows are determined to be less than a given threshold relating to network and system capacity, an adjustment is effected to increase the aggregated data flows.

3. The method of claim 1, wherein if the aggregated data flows are determined to exceed a given threshold relating to network and system capacity, an adjustment is effected to at least one of reducing and maintaining the aggregated data flows.

4. The method of claim 1, wherein the aggregated data flows include data on content elements of the online content including at least one of an in-view time and in-view rate.

5. The method of claim 1, wherein the aggregated data flows include data reflecting at least one of consumer behavior and media behavior.

6. The method of claim 1, wherein the aggregated data flows include sampled data.

7. The method of claim 1, wherein the aggregated data flows include sample rates.

8. The method of claim 1, wherein the sample data collection script is configured to modify the sample rate based at least in part on at least one of 1) information obtained from the downstream analytics server, 2) a decision by the data collection script based on information obtained from the downstream analytics server, and 3) a predetermined number provided to the sample data collection script.

9. The method of claim 1, wherein the sample data collection script is configured to determine if sampling is required, by attempting to access a document provided by a content server, the document containing instructions and recommended sample rates, and if no document is returned, the sample data collection script is configured to use a default sample rate configured to program itself.

10. The method of claim 1, wherein the sample data collection script renders in at least one of a browser and application in each of the plurality of user devices and is configured with a capability to at least one of 1) stop and 2) not send data to a downstream analytic server upon receiving instructions from another computer.

11. A system including one or more servers coupled to a network, for dynamically adjusting sample rates of variables relating to attention by users to a webpage, the webpage displayed on a plurality of user devices concurrently connected, by the network, to a website displaying the webpage, the system comprising:

one or more processors in the one or more servers;

memory storing instructions that cause the one or more processors to:

designate a desired sample rate by determining one or more statistical characteristics of aggregated data derived from gathering sample data relating to attention by each of a plurality of users to online content on the webpage, wherein the online content is at least one of text, picture and video;

monitor aggregated data flows from the plurality of user devices to determine if current new information for particular online content is required for statistical accuracy, wherein the monitoring is at least in part by a sample data collection script placed in the plurality of user devices;

assess the impact of the aggregated data flows on a downstream analytic server; and adjust the aggregated data flows by changing sample rate parameters for measurement scripts provided to the plurality of user devices.

12. The system of claim 11, wherein if the aggregated data flows are determined to be less than a given threshold relating to network and system capacity, an adjustment is effected to increase the aggregated data flows.

13. The system of claim 11, wherein if the aggregated data flows are determined to exceed a given threshold relating to network and system capacity, an adjustment is effected to at least one of reducing and maintaining the aggregated data flows.

14. The system of claim 11, wherein the aggregated data flows include data on content elements of the online content including at least one of an in-view time and in-view rate.

15. The system of claim 11, wherein the aggregated data flows include data reflecting at least one of consumer behavior and media behavior.

16. The system of claim 11, wherein the aggregated data flows include sampled data.

17. The system of claim 11, wherein the aggregated data flows include sample rates.

18. The system of claim 11, wherein the sample data collection script is configured to modify the sample rate based at least in part on at least one of 1) information obtained from the downstream analytics server, 2) a decision by the data collection script based on information obtained from the downstream analytics server, and 3) a predetermined number provided to the sample data collection script.

19. The system of claim 11, wherein the sample data collection script is configured to determine if sampling is required, by attempting to access a document provided by a content server, the document containing instructions and recommended sample rates, and if no document is returned, the sample data collection script is configured to use a default sample rate configured to program itself.

20. The system of claim 11, wherein the sample data collection script renders in at least one of a browser and application in each of the plurality of user devices and is configured with a capability to at least one of 1) stop and 2) not send data to a downstream analytic server upon receiving instructions from another computer.

* * * * *